United States Patent Office.

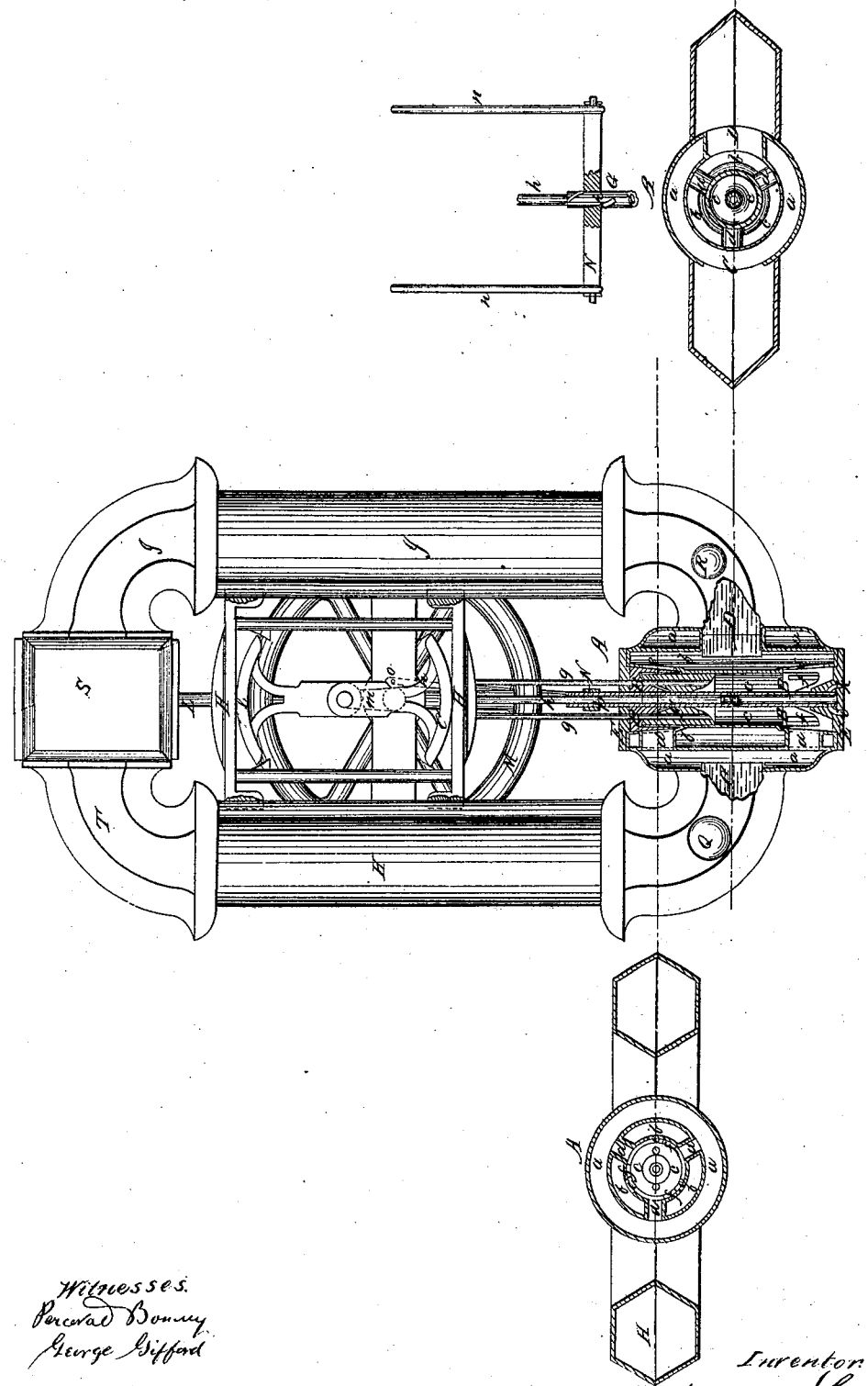

JOHN A. LIDBACK, OF PORTLAND, MAINE, ASSIGNOR TO HIMSELF AND HENRY BAKER, OF SAME PLACE.

Letters Patent No. 98,279, dated December 28, 1869

STEAM-PUMP.

The Schedule referred to in these Letters Patent and making part of the same

*To all whom it may concern:*

Be it known that I, JOHN A. LIDBACK, of Portland, in the county of Cumberland, and State of Maine, have invented a new and improved Steam-Pump; and I do hereby declare that the following is a full and exact description thereof, reference being had to the annexed drawings, and to the letters of reference marked thereon.

The nature of my invention consists in a pump, A, with three cylinders inserted in each other, so that the outside cylinder $a$ constitutes a suction-chamber, cylinder $b$ the discharge-chamber, and cylinder $c$ the chamber for the action of the piston F.

$d\ d\ d$ represent the ports admitting the water into cylinder $c$ from cylinder $a$.

$e\ e\ e$ represent ports discharging water into cylinder $b$ from cylinder $c$.

C represents entrance to cylinder $a$.

D represents outlet of cylinder $b$.

B B represent conical oscillating valves at the extremities of cylinder $c$.

$f\ f\ f$ represent the ports in valves B B.

E E represent cylinder-heads, closing in valves B B.

F represents double-acting piston, operated by piston-rods $g\ g$, and playing in cylinder $c$.

Passing through the cylinder $c$ is the oscillating feed-pump G for the supply of water to the boiler.

The valves B B are attached to, and oscillate by the oscillation of this pump G.

$h$ represents piston-rod to pump G.

$i$ represents the discharge-port of the feed-pump G.

$k$, the suction-port of feed-pump G.

The general frame-work consists of two upright air-chambers, H and I.

H represents the vacuum-chamber, connecting with suction-chamber $a$.

I represents air-chamber, connecting with force-chamber $b$.

Q represents inlet to vacuum-chamber H.

R, outlet from force-chamber $b$.

The arrangement for working the pumps and valves consists of a sash, or frame, K, connected with the piston-rods $g\ g$ of pump A, and piston-rod $h$ of pump G, and driven by steam-piston rod L.

Within this frame K are two rockers, $l\ l$, driving the crank $m$ by the motion of frame K.

M represents balance-wheel on crank-shaft $m$, and $n$, valve-connecting rods attached to balance-wheel M by crank-pin $o$.

N represents cross-head attached to connecting-rods $n$, and sliding perpendicular in spiral slots or guides $p$, on oscillating feed-pump G, by which the valves B B are made to oscillate.

S represents steam-cylinder.

T represents steam and exhaust-passages.

The operation of the invention is as follows:

When the double-acting-piston or plunger F ascends, the water rushes in at Q and C, into and through cylinder $a$, by ports $d\ d\ d$, into cylinder $c$, filling it with water. When the plunger F returns or descends, the cross-head N, with slots or guides, descending, causes the feed-pump G to oscillate, thus oscillating the valves B B attached thereto, thereby closing the ports $d\ d\ d$, and opening the ports $e\ e\ e$, by which the water has access into cylinder $b$, and is forced through the outlet D and R into the hose-pipe, or elsewhere.

What I claim as my invention, and desire to secure by Letters Patent, is as follows:

1. A pump with three cylinders enclosed in each other, constituting three chambers connected by ports, one for plunger, one for suction, and one for force, substantially as described.

2. The oscillating conical valve B, in combination with cylinders $a$, $b$, $c$, as described.

3. The combination of the oscillating feed-pump G, and oscillating conical valve B, substantially as set forth.

4. The spiral guide or slot $p$, on feed-pump G, in combination with perpendicular-moving cross-head N, sliding on the same, causing the oscillation of the valves B B, substantially as described.

5. The construction and arrangement of sash K and rockers $l\ l$, substantially as described.

JOHN A. LIDBACK.

Witnesses:
PERCIVAL BONNEY,
GEORGE GIFFORD.